United States Patent [19]

Banerjee

[11] Patent Number: 5,128,014
[45] Date of Patent: Jul. 7, 1992

[54] IRRADIATION OF CATION EXCHANGE MEMBRANES

[75] Inventor: Shoibal Banerjee, Newark, Del.

[73] Assignee: E. I. Du Pont de Nemours and Company, Wilmington, Del.

[21] Appl. No.: 675,070

[22] Filed: Mar. 26, 1991

Related U.S. Application Data

[63] Continuation-in-part of Ser. No. 663,003, Mar. 1, 1991, abandoned.

[51] Int. Cl.$^5$ .................. C25B 13/00; C07C 1/00; C08J 5/20
[52] U.S. Cl. .................. 204/296; 204/157.15; 521/27
[58] Field of Search ............... 521/27; 204/157.15, 204/296

[56] References Cited

U.S. PATENT DOCUMENTS

| | | | |
|---|---|---|---|
| 3,282,875 | 10/1966 | Connolly et al. | 204/169 |
| 3,718,627 | 2/1973 | Grot | 204/165 |
| 4,012,303 | 3/1977 | D'Agostino et al. | 204/296 |
| 4,107,005 | 8/1978 | D'Agostino et al. | 204/165 |
| 4,113,922 | 9/1978 | D'Agostino et al. | 429/29 |
| 4,138,426 | 2/1979 | England | 558/65 |
| 4,285,795 | 8/1981 | Beretta | 204/165 |
| 4,287,032 | 9/1981 | Pellecri | 204/164 |
| 4,349,422 | 9/1982 | Maloney | 204/165 |
| 4,429,435 | 2/1984 | Walls | 204/165 |
| 4,437,951 | 3/1984 | Bissot et al. | 204/296 |
| 4,439,292 | 3/1984 | Klotz et al. | 204/165 |
| 4,506,035 | 3/1985 | Barnett et al. | 521/53 |
| 4,595,476 | 6/1986 | Bissot | 204/521 |
| 4,602,045 | 7/1986 | Markus et al. | 204/296 |
| 4,661,218 | 4/1987 | Oda et al. | 204/165 |

FOREIGN PATENT DOCUMENTS

| | | |
|---|---|---|
| 57065B | 1/1981 | European Pat. Off. |
| 133257 | 10/1977 | Fed. Rep. of Germany |
| 5013285 | 6/1973 | Japan |
| 8144098 | 12/1973 | Japan |
| 51-131487 | 5/1975 | Japan |
| 5426976 | 8/1977 | Japan |
| 56100638 | 12/1979 | Japan |
| 6055033 | 9/1983 | Japan |

Primary Examiner—John Niebling
Assistant Examiner—Steven P. Marquis

[57] ABSTRACT

The present invention is a process for modifying a fluorinated cation exchange membrane by irradiation of the membrane with a sufficient dose of non-spark-producing radiation to decrease the voltage in the use of the membrane for electrolyzing brine.

8 Claims, 3 Drawing Sheets

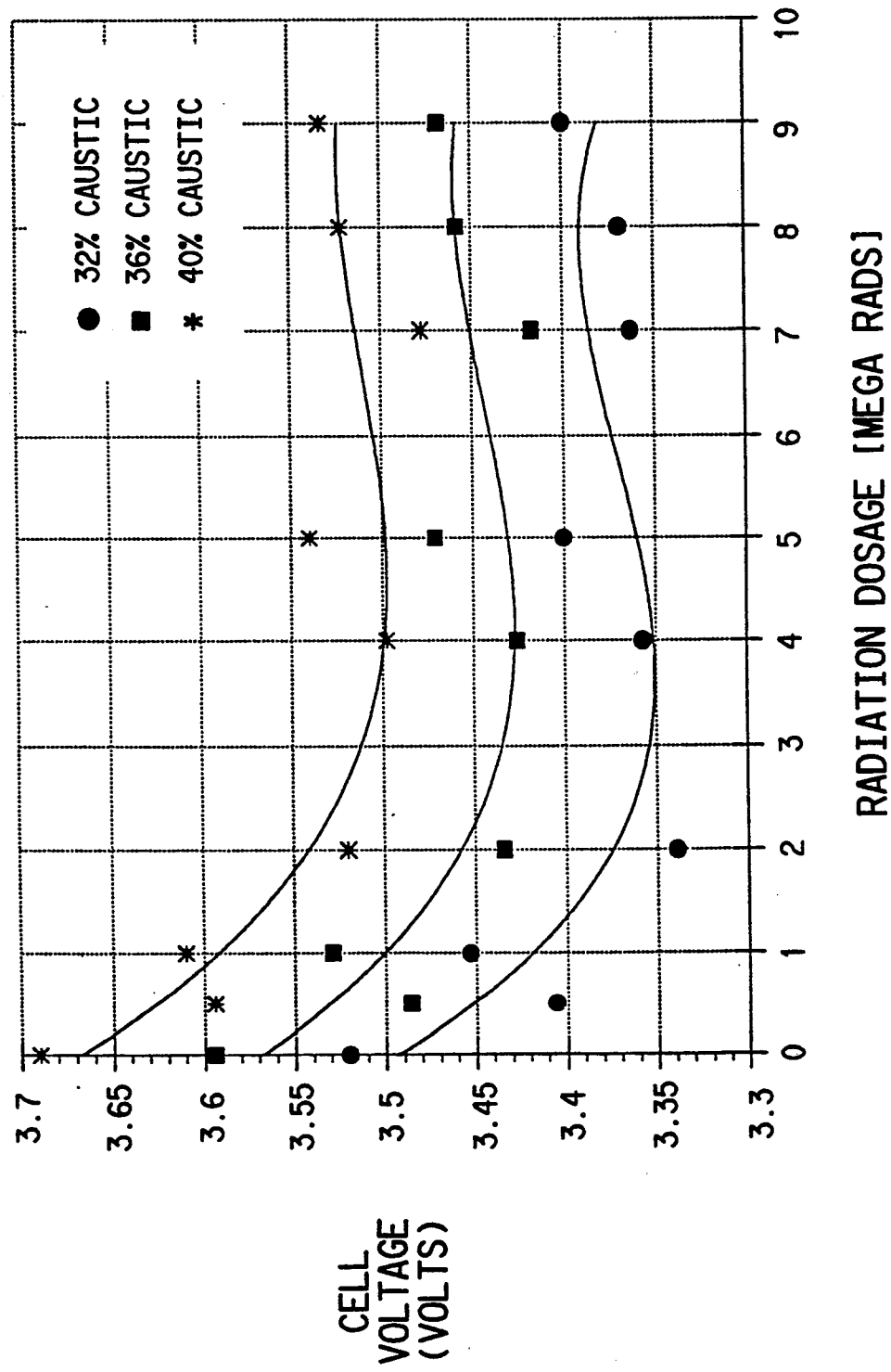

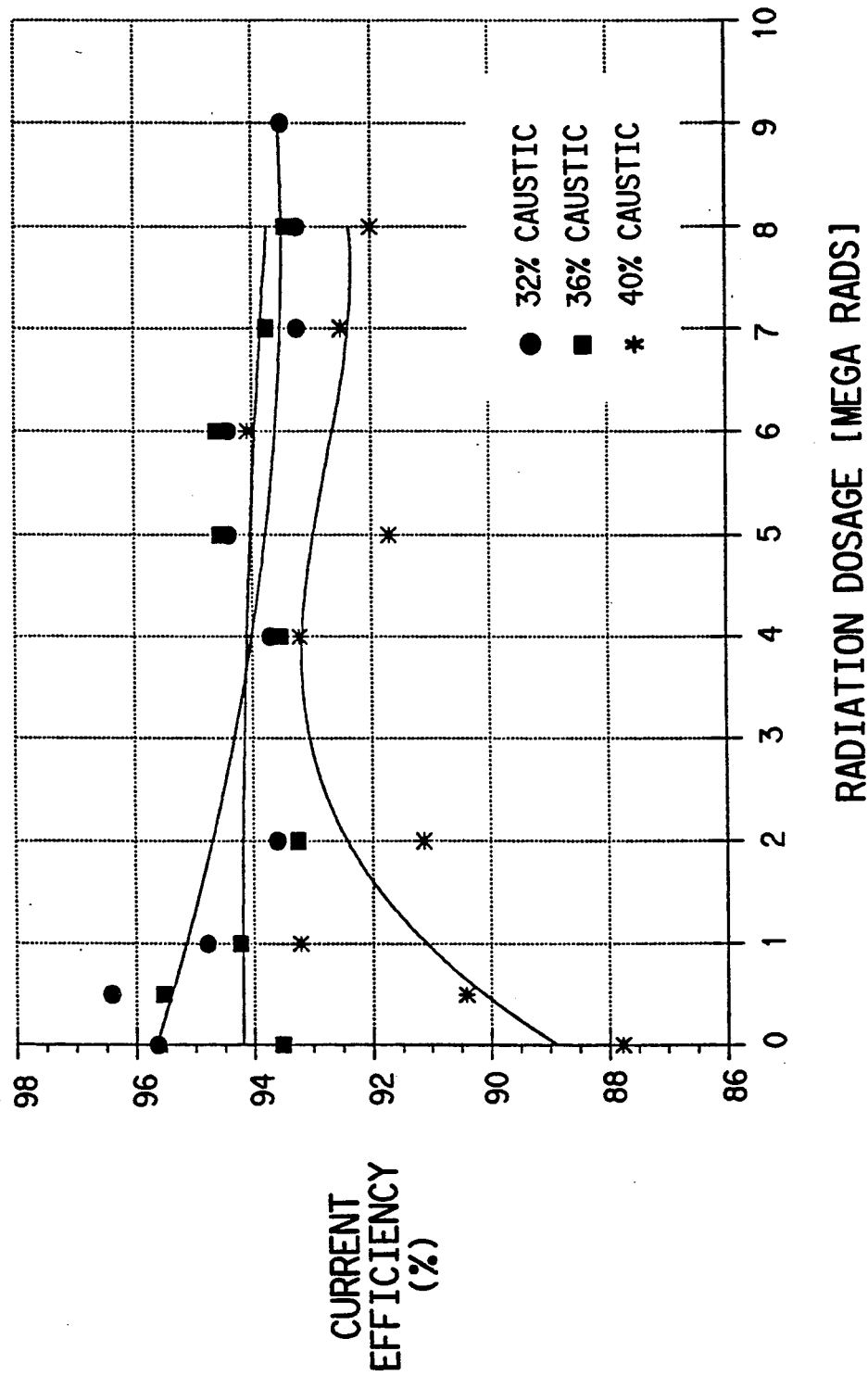

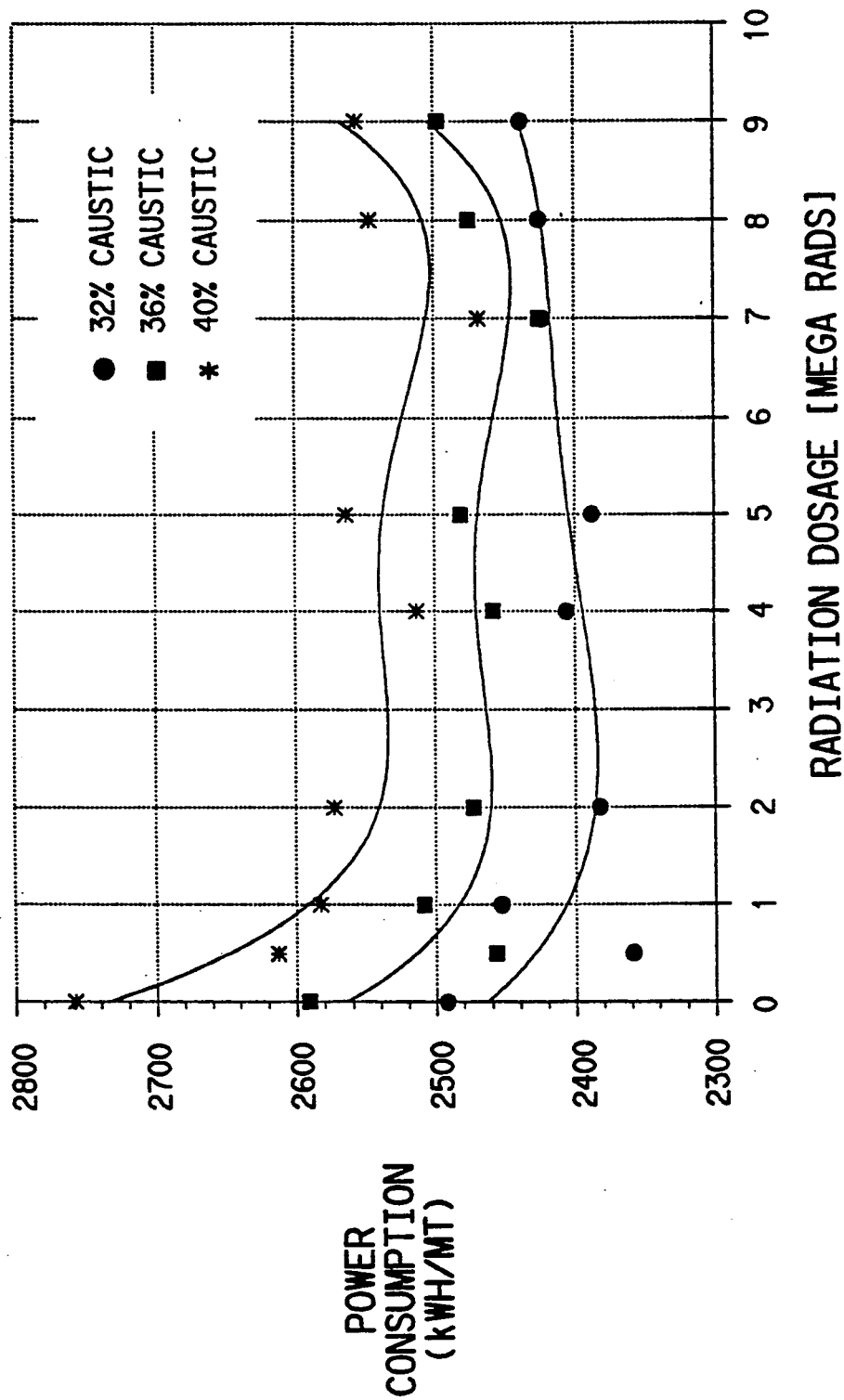

IRRADIATION OF CATION EXCHANGE MEMBRANES

This application is a continuation-in-part of Ser. No. 07/663,003, filed Mar. 1, 1991 now abandoned.

FIELD OF THE INVENTION

This invention is concerned with irradiation processes for the treatment of cation exchange membranes to make them more suitable for electrolysis and for separation processes.

BACKGROUND OF THE INVENTION

The state-of-the-art method for electrolyzing an alkali metal halide, especially sodium chloride (NaCl) or potassium (KCl), is to use a fluorinated membrane to separate the anolyte and catholyte compartments. The membrane permits the alkali metal cation to pass through to the catholyte, but severely restricts the undesirable passage of hydroxyl ion from the catholyte to the anolyte. To make membrane electrolysis attractive, the power consumption should be minimized, which means that the current efficiency should be maximized and the cell voltage (or resistance) should be minimized.

Many efforts have been made to improve the performance of these membranes by a wide variety of treatments. Most of them have been aimed at higher current efficiency or lower power consumption. However, it is also desirable to obtain lower voltage. Any voltage over that needed to electrolyze brine is lost as heat and this represents a waste of electric power. Excessive heat production can limit electrolyzer productivity by raising cell temperatures and increasing gas volume. Also, the rectifiers used in chloralkali plants are rated for power, which is the product of voltage and amperage. At higher voltages, less amperage can be supplied, reducing the productivity of the electrolyzers.

The art which is believed to be closest to the present invention U.S. Pat. No. 4,439,292 (Klotz et al., Bayer). These inventors reduced cell voltage by treating fluorinated carboxyl membranes with corona discharge, a process in which an electrical discharge or spark is passed from one electrode to another through a gas and through the sample to be treated. Klotz et al. found that heating damaged the membrane. They chose to keep the temperature below 80° C., preferably below +22° C., and most preferably below −20° C. To prevent heat damage, Klotz et al. exposed the sample to corona discharge 1000–5000 times, with cooling between exposures. Clearly, the need to use thousands of exposures is a severe limitation to the usefulness of this process.

SUMMARY OF THE INVENTION

In the present invention, non-spark-producing ionizing radiation such as from beta, gamma, or X-rays, is used. It has been found that little temperature rise occurs with an effective amount of radiation in a single exposure. This permits use of a process with only one exposure or a very fe exposures.

The preferred method of irradiation is electron beam irradiation, another name for beta radiation.

The process of the invention is quite useful in producing sodium hydroxide (NaOH) in the present commercial range of 32–36 weight percent (wt. %) NaOH, providing lower voltage and lower power consumption. The process is especially useful in producing about 40 wt. % NaOH).

FIGURES.

FIG. 1 plots cell voltage in volts vs. radiation dosage in megarads for irradiation of a hydrolyzed membrane.

FIG. 2 plots caustic current efficiency vs. radiation dosage for the synthesis of 32 wt. % caustic, 36 wt. % caustic, and 40 wt. % caustic using membranes irradiated in the hydrolyzed form.

FIG. 3 plots power consumption in kilowatt hours/metric ton vs. radiation dosage for the synthesis of 32 wt. % caustic, 36 wt. % caustic, and 40 wt. % caustic using membranes irradiated in the hydrolyzed form.

FIG. 4 plots cell voltage in volts vs. radiation dosage in megarads for a membrane irradiated before hydrolysis.

DETAILED DESCRIPTION OF THE INVENTION

The sources of spark-free ionizing radiation in common use are (1) gamma sources, such as Co-60 and Cs-137 (2) electron beam accelerators (often referred to as linear accelerators), and (3) x-ray sources. Allionizing radiation produces free radicals in the absorbing medium (the material being irradiated). The behavior of the free radicals produced is determined by the nature of the absorbing medium. The main difference between these three sources is the manner in which the radiation travels through the material being irradiated.

The most common sources of gamma radiation are Co-60 and Cs-137. Co-60 is made by pre-forming non-radioactive Co into rods or bars, then subjecting them to a neutron source such as the neutrons produced in a nuclear power plant.

Gamma radiation is emitted in a complete sphere, requiring the target material to completely surround the source if all of the irradiation is to be utilized. Gamma radiation is absorbed on a logarithmic basis as it travels in a material. In order to get a more uniform dose in the material, double sided exposure may be used, but is not necessary with a relatively thin material such as a chloralkali membrane.

Gamma rays have a major advantage, penetration. This is not important in irradiating thin membranes.

The major disadvantages of radioactive sources are (1) high maintenance costs (replacement of source material), (2) the need for extreme safety precautions, (3) relatively low dose rate, and (4) the problems associated with transporting, storing and disposing of highly radioactive substances. In addition, since the radioactive decay cannot be controlled (turned on and off) the facility must be operated continuously to realize a high efficiency.

X-rays are produced when high energy electrons are used to bombard metals. The efficiency of the x-ray source is determined by the molecular or atomic weight of the target and by the energy (accelerating voltage) of the electrons. The higher the molecular weight of the target material, the greater the efficiency. The efficiency is also proportional to the accelerating voltage.

The penetration characteristics of x-rays are 5–20% greater than those of gamma rays.

The source of beta radiation is an electron beam accelerator. Electrons can be accelerated by (1) high DC voltages, (2) electric pulses, (3) magnetic pulses, or (4) a combination of these three. Cockcroft-Walton, isolated core, resonant transformer, Dynamitron, Klystron, and Linacs are some of the names given to the techniques of producing high voltages.

Absorption of high energy electrons in material is such that 90% of the beam energy may be used with a maximum to dose ratio of 1.4 using a single pass under the beam.

The main advantages of the electron beam accelerators are the (1) high power and high throughput, (2) relatively low unit cost, (3) high does rate, and (4) intrinsic safety. In addition, since electron accelerators may be turned off, the facilities do not have to be operated continuously. The main disadvantage of electron beam accelerators if the relatively small penetration of the electrons, about 2.1 cm in water for a 5 Mev source. This is not a significant disadvantage for irradiation of membranes, which are thin. Therefore, electron beam accelerators are the preferred source of ionizing radiation for this invention.

The membranes treated in this invention may be any membrane in hydrolyzed, partially hydrolyzed, or unhydrolyzed form known in the art for electrolysis of chloride salts. By hydrolyzed form, it is meant to include sulfonate or carboxylate salts and sulfonic and carboxylic acids.

In the irradiation process, the membrane is exposed to irradiation for a sufficient time and at a sufficient dose rate to cause a decrease in membrane resistance and thus a decrease in the voltage needed when the membrane is used for electrolysis of NaCl or KCl. The total dosage should be at least 0.1 megarads, preferably 0.1–2.0, most preferably 0.1–2.0 megarads. Dosage higher than 2 megarads is possible, as can be seen in the Figures, but does not provide further improvement in the power consumption of the membrane.

The total dosage is a function of the time of each exposure, the dose rate, and the number of exposures. Preferably the number of exposures should be low, most preferably one. The dose rate will depend on the type of radiation used, the device used to generate the radiation, and the energy input to the source of radiation. For a given dose rate, the time of exposure can be varied to provide the preferred total dosage. A preferred way of controlling the time of exposure is to vary the speed of a conveyor system carrying the membrane through the irradiation zone.

The membrane used in this invention is fluorinated, which means that at least 90%, preferably at least 95%, and most preferably all of the atoms attached to the carbons are F atoms or side-chain ether group, which may contain functional groups hydrolyzable to salts. The non-fluorine atoms, if used, may be H, Cl, or Br.

Preferably, the membrane used in the electrolytic cells according to the process of this invention consists of at least two layers, at least the one layer in contact with the anolyte having pendant sulfonyl groups.

The sulfonyl polymers of which at least one membrane layer in contact with an anolyte according to this invention can be made are fluorinated polymers with side chains containing the group $-CF_2CFR'SO_2X$, wherein $R'$ is F, Cl, $CF_2CL$ or a $C_1$ to $C_{10}$ perfluoroalkyl radical, and X if F or Cl, preferably F. Ordinarily, the side chains will contain $-OCF_2CF_2CF_2SO_2X$ or $-OCF_2CF_2SO_2F$ groups, preferably the latter. The prefluorinated polymers are preferred.

Polymers containing the side chain

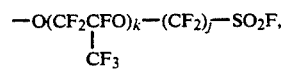

where k is 0 is 1 and j is 3, 4, or 5, may be used. These are described in U.S. Pat. No. 4,329,435 (Kimoto et.al., Asahi Glass).

Polymers containing the side chain $-CF_2CF_2SO_2X$ are described in U.S. Pat. No. 3,718,627 (Grot, Du Pont).

Preferred polymers contain the side chain $-(OCF_2CFY)_r-OCF_2CFR'SO_2X$, where $R'$, Y, and X are defined above; and r is 0, 1, 2, or 3. Some of those polymers are described in U.S. Pat. No. 3,282,875 (Connolly et.al., Du Pont). Especially preferred are copolymers containing the

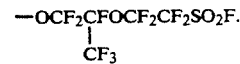

side chain.

The salt-form carboxylic polymers of which the membrane layer in contact with the catholyte is made have a fluorinated hydrocarbon backbone chain to which are attached side chains carrying, before hydrolysis to the salt form, certain functional groups hydrolyzable in an alkaline medium to carboxylate groups, such as nitrile or ester groups. Those polymers include, e.g., those containing the $-(OCF_2CFY)_n-O-CF_2-CF_2W$ side chains, where Y is F or $CF_3$; n is 0, 1, or 2; and W is COOR or $-CN$, where R is lower alkyl. Such polymers are described in U.S. Pat. No. 4,138,426 (England, Du Pont). Among these polymers, those with n=1 and Y=$CF_3$ are preferred.

Polymerization can be carried out by the methods described in the above references. Especially useful is solution polymerization using 1,2,2-trichloro-2,1,1-trifluoroethane as the solvent and perfluoropropionyl peroxide as the initiator. Polymerization can also be carried out by aqueous granular polymerization.

The copolymers used in the manufacturer of membrane layers used in the process of the present invention should be of high enough molecular weight to produce films which are self-supporting in both their melt-fabricable (precursor) form and in the hydrolyzed ion exchange form.

A membrane having at least one layer of a copolymer having sulfonyl groups in melt-fabricable form and a layer of a copolymer having carboxyl group in melt-fabricable form, such as made by coextrusion, can be used in the process of the present invention; or can be used as one of the component films in making, by hydrolysis, the membrane to be used in the process of the present invention. Such a laminated structure will be occasionally referred to herein as a bimembrane. Bimembranes are well known in the art.

It is in fact preferred to use in the present process a carboxylate/sulfonate bimembrane, and it is possible for the sulfonate layer to have an equivalent weight lower than that of the carboxylate layer by at least 50 units.

It is also possible to use an all-carboxylate membrane with a layer of lower equivalent weight on the anolyte side.

The membrane used in this invention may also comprise three layers:

(a) on the catholyte side, a carboxylate layer of a 5–50 micrometer thickness, preferably 20–40 micrometers, with an equivalent suitable to provide a water transport of 3.0–4.0 moles of water per gram-atom of Na, (b) in the middle, an optical carboxylate layer with a lower equivalent weight, preferably 75-100 micrometers.

Membranes usually have an overall thickness of 50-3000 micrometers, especially 125-200 micrometers.

The customary way of specify the structural composition of films or membranes in this field is to specify the polymer composition, ion-exchange capacity or equivalent weight, and thickness of the polymer films in melt-fabricable form, from which the membrane is fabricated. This is done because the measured thickness varies depending on whether the membrane is dry or swollen with water or an electrolyte, and even on the ionic species and ionic strength of the electrolyte, even though the amount of polymer remains constant.

For use in electrolysis of brine, the membrane should have all of the functional groups converted to ionizable functional groups. These will be sulfonate and carboxylate groups, preferably the sodium or potassium salts thereof.

Conversion to ionizable functional groups is ordinarily and conveniently accomplished by hydrolysis with acid or base, such that the various functional groups described above in relation to the melt-fabricable polymers are converted respectively to the free acids or the sodium salts thereof. Such hydrolysis can be carried out in an aqueous bath of either a mineral acid or sodium hydroxide. Alkaline hydrolysis is preferred as it is faster and more complete. Use of hot hydrolysis baths, such as near the boiling pont of the solution, is preferred for rapid hydrolysis. The time required for hydrolysis increases with the thickness of the structure. It is advantageous to include in the hydrolysis bath a water-miscible organic compound such as, e.g. dimethyl sulfoxide to swell the membrane and thus increase the rate of hydrolysis.

The equivalent weight desired is not critical, and depends somewhat on the structure of the salt-containing side chain on each polymer. It may be obtained by using a mole ratio of tetrafluoroethylene to the comonomer in the carboxylate copolymer of 5.0-8.2, preferably 6.0-7.4. In the case where the carboxylate side chains are salts of $-OCF_2-CF(CF_3)-O-CF_2-CF_2-COOH$, the broad equivalent weight of the non-porous layer in contact with the catholyte should be 908-1230, and the preferred equivalent weight will be 1008-1150. The equivalent weights are expressed for the $-COOCH_3$ form.

The equivalent weight of the sulfonate polymer is even less critical. It should be low enough to give low membrane resistance (low electrolysis voltage), but not so low as to give a membrane which is too soft or sticky when wet for convenient handling and installation in a cell. In the case where the side chain is the salt of $-O-CF_2-CF(CF_3)-O-CF_2-CF_2-SO_3H$, the equivalent weight should be 800-1500, preferably 900-1300, and most preferably 1000-1200. The equivalent weight of the sulfonate layer is calculated for the $-CO_3H$ form. Optionally, the sulfonate layer may have an equivalent weight lower than that of the adjacent carboxylate layer.

The membrane may be unreinforced film or bifilm, but for dimensional stability and greater notched tear resistance, it is common to use a reinforcing material. It is customary to use a fabric made of a fluorocarbon resin such as polytetrafluoroethylene or a melt-processable copolymer of tetrafluoroethylene with hexafluoropropylene or with perfluoro(propyl vinyl ether). These may be woven into fabric using various weaves, such as the plain weave, basket weave, leno wave, or others. Relatively open weaves are preferred because the electric resistance is lower. A porous set may be used as a support. Other perhalogenated polymers such as polychlorotrifluoroethylene may also be used, but perfluorinated supports have the best resistance to heat and chemicals. The fibers used in the support fabrics may be monofilaments or multifilament yarns. They may be of ordinary round cross-section or may have specialized cross-sections. Oblong or rectangular cross-sections, if suitably oriented to the membrane, make is possible to get more reinforcing action with a thinner overall membrane. It may be desirable to use sacrificial fibers such a rayon, paper, or polyester, along with the fluorocarbon fibers, as described in U.S. Pat. No. 4,437,951 (Bissot et.al., Du Pont). Care should be taken, however, not to have the soluble or degradable fibers extend from one surface to the other lest the nonporous membrane become a porous diaphragm, and the caustic product contain too much salt. Even with a cloth or mesh of fluorocarbon fibers, it is preferred not to have the cloth penetrate the surface of the membrane on the cathode side. The fabric employed may be calendered before lamination to reduce its thickness. In a bimembrane, the fabric may be in the sulfonate or carboxylate layer, or in both, but is more often in the sulfonate layer, which is usually thicker. In place of fabric, fibrils can be used.

One of the uses for the membranes made by this invention is electrolysis, particularly the electrolysis of NaCl or KCl or make NaOH or KOH, respectively.

The membrane or bimembrane may be used fat in various known filter press cells, or may be shaped around an electrode. The latter is especially useful when it is desired to convert an existing diaphragm cell to a membrane cell in order to make higher quality caustic.

Membranes can be swelled with polar solvents (such as lower alcohols or esters, tetrahydrofurona, or chloroform) and then dried, preferably between flat plates, to improve their electrolytic performance. Before mounting in commercial cell support frames, which may be 1 $\propto$ 5 meters on a side, the membrane can be swelled so that it will not wrinkle after it is clamped in the frame and exposed to electrolytic fluids. Among the swelling agents that can be used are water, berine, sodium bicarbonate solution, caustic, lower alcohols, glycols, or mixtures thereof. See, for example U.S. Pat. No. 4,595,476 (Bissot, Du Pont).

The cell can have two or three compartments, or even more. If three or more compartments are used, the membrane is commonly placed next to the cathode compartment, and the other dividers may be porous diaphragms or membranes based on polymers having pendant side chains with terminal $-CF_2-SO_3Na$ groups only. The cells may be connected in series (so-called bipolar cells) or in parallel (so-called monopolar cells).

The membrane may be disposed horizontally or vertically in the cell, or at any angle from the vertical.

The membrane may be disposed horizontally or vertically in the cell, or at any angle from the vertical.

Any of the conventional electrodes or electrode configurations may be used. The anode should be resistant to corrosion by brine and chlorine and to erosion and preferably should contain an electrocatalyst to minimize chlorine overvoltage. A commercially available anode known as dimensionally stable anode (or DSA) is one of those that are suitable. A suitable base metal is titanium, and the electrocatalysts include reduced platinum group metal oxides (such as Ru and the like), singly or in mixtures, optionally admixed with a reduced oxide of Ti, Ta, Cb, Zr, Hf, V, Pt, or Ir. The electroctalysts may be heat-treated for stability.

The anode may be a "zero-gap" anode, against which the membrane is urged and which anode is permeable to both liquids and gases. The anode may be kept a small distance from the membrane by the use of a spacer, against which the membrane is urged by a small hydraulic head on the other side of the membrane. The spacer may be made of a plastic which is resistant to the chemicals in the anolyte, such as polytetrafluoroethylene, ethylene/tetrafluoroethylene copolymer, or polychlorotrifluoroethylene. It is desirable that the spacer or the electrode have open vertical channels or grooves to facilitate the escape of gas evolved at the anode. Whether or not there is a spacer, it may be desirable to have the anode openings slanted, so that the gas is carried away from the membrane, and anolyte circulation past the membrane is maximized. This effect can be augmented by using downcomers for anolyte which has been lifted by the rising gas bubbles. The anode may be a screen or perforated plate or powder which is partially embedded in the anode surface layer of the bimembrane. In this case, the current may be supplied to the anode by current distributors which contact the anode at numerous closely-spaced points. The anode may be a porous catalytic anode attached to or pressed against the membrane or attached to or pressed against a porous layer, which is in turn attached to or pressed against the membrane.

The cathode should be resistant to corrosion by the catholyte, resistant to erosion, and preferably will contain an electrocatalyst to minimize hydrogen overvoltage. The cathode may be, e.g., mild steel, nickel, or stainless steel, and the electrocatalyst may be platinum black, palladium, gold, spinels, manganese, cobalt, nickel, Raney nickel, reduced platinum group metal oxides, alpha-iron, or the like.

The cathode may be a "zero-gap" cathode, against which the membrane is urged and which cathode is permeable to both liquid and gases. The cathode may be kept a small distance from the membrane by the use of a spacer, against which the membrane is urged by a small hydraulic head on the other side of the membrane. In the case of a three-compartment cell, both membranes may be urged against electrodes or spacer by a hydraulic head on the center compartment. The spacer may be made of a plastic which is resistant to the chemicals in the catholyte, such as polytetrafluoroethylene, ethylene/tetrafluorethylene resin, or polychlorotrifluoroethylene. It is desirable that the cathode spacer or electrode have open vertical channels or grooves to facilitate the escape of gas evolved at the cathode. Whether or not there is a spacer, it may be desirable to have the cathode openings slanted so the gas is carried away from the membrane and catholyte flow past the membrane is maximized. This effect may be augmented by using downcomers for catholyte which has been lifted by rising gas bubbles. The cathode may be a porous cathode, pressed against the membrane or pressed against a porous layer, which is in turn attached to or pressed against the membrane.

An oxygen cathode can be used, in which oxygen is supplied to the cathode and substantially no hydrogen is evolved, with lower cell voltages as a result. The oxygen may be supplied either by bubbling through the catholyte and against the cathode, or by feeding oxygen-containing gas through a porous inlet tube which also serves as anode and is coated with electrocatalyst.

It has long been known that it is desirable in the electrolysis of brine to use sodium chloride of low Ca and Mg content. It is also well known how to remove hardness from sodium chloride solutions to very low levels. Heavy metals like iron and mercury and foreign anions such as iodide should also be substantially removed. Some of the contaminants in make-up brine can be removed by passing the brine through a diaphragm cell before it is fed to the membrane cell system. Further hardness reductions can be achieved by passing the brine through a chelate ion exchanger, preferably one containing —NHCH$_2$COOH groups, or a phosphate may be added to the brine to precipitate insoluble salts.

Brine fed to the cell is usually close to its saturation concentration, which is about 26 wt. % both at room temperature and at about 80° C., but a slightly lower brine concentration is acceptable. Brine concentrations in the anolyte compartment are measured on exit brine. By the time the brine concentration is measured by hydrometer, the brine has usually cooled to close to room temperature. Exit brine concentration may be about 18% or 204 g/l if it is desired to make 42% caustic. The usual way to control brine concentration is to control brine feed rate, which causes the anolyte to overflow to resaturation equipment.

While the membrane made by the process of this invention is especially suitable for making concentrated caustic, it should be started up at more conventional conditions. First, the membrane is converted to the Na salt form by treatment with an aqueous solution of about 2% sodium hydroxide or sodium bicarbonate and is installed in the cell. The cell is charged with caustic at less than 35% NaOH concentration, preferably less than 30%, and with 15-26% brine, preferably about 18%, with pH equal to or greater than 2. The electrolyzer is heated to 65°-90° C., and flow of current is started gradually, so that the cell voltage does not exceed 4.0 V. Flow of saturated brine to the anolyte and water to the catholyte is started, and the operation is stabilized at 25-35% caustic, preferably 30-32%, for one to two days. Water feed to the catholyte is then stopped, and the concentration of exit brine is controlled at about 18%, to gradually bring the caustic concentration to about 42%; to make lower concentration caustic, some water is added to the cathode. Higher caustic concentration can be achieved by increasing the exit brine concentration.

Because a bimembrane or multi-layer membrane containing one or more sulfonate layers has lower electrical resistance than an all-carboxylate membrane, it can be operated at lower voltage or higher current density. Good results can be obtained at 2-5 kA/m$^2$, preferably 3-4 kA/m$^2$.

It is desirable to acidify the anolyte to minimize the formation of oxygen and chlorate at the anode. Overacidification is not as serious an error in the case of a carboxylate/sulfonate bimembrane as in the case of an all-carboxylate membrane, because the —CF$_2$SO$_3$H group is a stronger acid than the —CF$_2$COOH group, and the sulfonate form, —CF$_2$SO$_3$—, resists conversion to the acid form by overacidification more strongly than does the carboxylate ion form. The free acids are to be avoided because they increase membrane voltage.

Anolyte acidity is normally adjusted to a pH value in the range of 1–5 by addition of hydrochloric acid or hydrogen chloride to the recycle brine. Recycle brine may be concentrated by addition to solid salt and/or by evaporating or distilling water from the stream.

While membrane cells are frequently operated at approximately atmospheric pressure, there can be advantages to operating them at elevated pressure. While direct current is ordinarily used in membrane cells, one can also use pulsed direct current or half-wave alternating current or rectified alternating current or direct current with a square wave.

Brine electrolysis is normally carried out at a temperature of about 70°–110° C., preferably 80°–100° C. At temperatures above about 100° C., pressure cells should be used.

The anode and/or cathode surface of the membrane may be coated with a gas- and liquid-permeable porous non-electrode layer. Such non-electrode layer can be in the form of a thin hydrophilic coating and is ordinarily of an inert electroinactive or non-electrocatalytic substance. micrometers. A non-electrode layer ordinarily comprises an inorganic component and a binder; the inorganic component can be an inorganic compound which is chemically stable in hot concentrated caustic and chlorine, and can be of a type as set forth in U.S. Pat. No. 4,661,218 (Oda et al., Asahi Glass), preferably tin oxide, titanium oxide, silicon carbide, or zirconium oxide. The particle size of the inorganic material can be about 0.01–10 micrometers, and preferably 0.1–5 micrometers.

The coating density should be 1–10 g of coating per square meter of membrane, preferably 1–5 g/m$^2$.

The binder component in the non-electrode layer can be, for example, polytetrafluoroethylene, a fluorocarbon polymer at least the surface of which is hydrophilic by virtue of treatment with ionizing radiation in air, or a modifying agent to introduce functional groups such as —COOH or —SO$_3$H (as described in U.S. Pat. No. 4,287,032 (Pellegri, Oronzio de Nora) or treatment with an agent such as sodium in liquid ammonia, a functionally substituted fluorocarbon polymer or copolymer which has carboxylate or sulfonate functional groups, or polytetrafluoroethylene particles modified on their surfaces with fluorinated copolymers having acid type functional groups (U.S. Pat. No. 4,661,218 Oda et al., Asahi Glass). Such binder can be used in an amount of about from 10 to 50 wt. % of the non-electrode layer. In addition to the inorganic component and the binder, the dispersion used to apply the inorganic component can include a thickener such as methyl cellulose or polyvinyl alcohol and a small amount of nonionic surfactant.

Composite structures having non-electrode layers thereon can be made by various techniques known n the art, which include preparation of a decal which is then pressed onto the membrane surface, spray application of a slurry in a liquid composition (for example, dispersion or solution of the binder followed by drying, screen or gravure printing of compositions in paste form, hot pressing of powders distributed on the membrane surface, and other methods disclosed in the art. Such structures can be made by applying the indicated layers onto membranes in melt-fabricable form, and by some of the methods onto membranes in ion-exchange form; the polymeric component of the resulting structures when in melt-fabricable form can be hydrolyzed in known manner to the ion-exchange form. Irradiation ca be carried out before or after coating, provided the hydrolyzed form is irradiated.

On the anolyte side, the membrane may have a bubble release coating. This may be a non-electrode coating as described above, and suitably may be ZrO$_2$. Another way to provide this gas-release coating is to provide optimum surface roughness or smoothness by hot roll embossing or by embossing with a porous paper. When embossing with a porous paper, a release paper can be applied to an outer surface of the membrane prior to passing through a laminator used, for example, to incorporate a reinforcement in the membrane. Such surface embossing is further described in U.S. Pat. No. 4,349,422 (Maloney, Du Pont). Preferably, the resulting surface roughness is about 2–65 micrometers as measured, for example, with a Bendix Model 1020 profilometer.

Membranes which carry thereon one or more non-electrode layers can be employed in an electrochemical cell in a narrow-gap or zero-gap configuration as described above.

EXAMPLES

EXAMPLE 1

The bifilms used in this example have the following layers which are adhered to one another: a 38 micrometer layer of a 6.4:1 mole ratio tetrafluoroethylene: CF$_2$=CFOCF$_2$CF(CF$_3$)OCF$_2$CF$_2$COOCH$_3$ copolymer on one side and a 100 micrometer layer of 6.58:1 mole ratio TFE:CF$_2$=CFOCF$_2$CF(CF$_3$)OCF$_2$CF$_2$SO$_2$F copolymer on the other side. The bifilms were hydrolyzed by soaking in a solution of 14% KOH/30% dimethylsulfoxide/56% water at 80°–100° C. for 16 hours. Each bifilm was 30×41 cm and weighted about 31 g after washing and drying.

The hydrolyzed fibilms were irradiated with an electron beam at Irradiation Industries, Inc. Gaithersburg Md. The equipment used for irradiation was a 3.0 million electron volt, 25 milliampere Dynamitron manufacturered by Radiation Dynamic, Inc. The irradiation dosage for the hydrolyzed bifilms was chosen to be 0, 0.5, 1,2,3,4,5,6,7,8, or 9 megrads.

The irradiated membranes along with a control (0 megarad) were preswelled in 2 wt % NaOH and installed in identical laboratory cells with an effective bifilm diameter of 7.5 cm. The hydrolyzed TFE:CF$_2$=CFOCF$_2$CF(CF$_3$)OCF$_2$COOOCH$_3$ copolymer layer was on the cathode side and the hydrolyzed TFE:CF$_2$=CFOCF$_2$CF(CF$_3$)OCF$_2$CF$_2$SO$_2$F copolymer layer was on the anode side. The cathode was mild steel, the titanium anode was activated with a coating containing ruthenium oxide, and the bifilm was urged against the anode by catholyte head. Highly purified NaCl solution was used in the anolyte. Electrolysis was carried out at 90° C. and 3.1 kA/m$^2$ current density to make 32, 36, and 40 wt % NaOH. Each cell was held at each caustic level for 15 days.

FIG. 1 shows the variation of cell voltage with radiation dosage at each caustic concentration. From the curves in FIG. 1, it is evident that, in the case of irradiate bifilms, the operating voltage was 75–200 millivolts lower (depending on the radiation level) compared with the control bifilm.

FIG. 2 shows the variation of caustic current efficiency with radiation dosage at each caustic concentration. From the curves in FIG. 2 it is evident that at 32% caustic the current efficiency decreased from 96% to 94% as the radiation dosage increased from 0 to 9 megarads, excepting at 0.5 megarad, where the current efficiency was higher by 0.5% compared to the control bifilm.

At 36% caustic the current efficiency remained substantially the same as that of the control, regardless of dosage up to 8 megarads.

At 40% caustic the current efficiency increased from 88% for the control to 91-93% at 1-8megarads.

Power consumption depends on both cell voltage and current efficiency. To obtain desirably low power consumption it is desirable to have low cell voltage and/or high current efficiency. FIG. 3 shows the variation of power consumption with radiation dosage at each caustic concentration. From the data it is evidence that the power consumption was 75-200 kWH/MT (kilowatt hour per metric ton) lower in case of the irradiated bifilms, depending on the radiation level and caustic concentration.

EXAMPLE 2

The bifilms used in this example had the following composition: 25 micrometer layer of a 6.4:1 $TFE:CF_2=CFOCF_2CF(CF_3)OCF_2CF_2COOCH_3$ copolymer on one side and a 100 micrometer layer of 6.58:1 $TFE:CF_2=CFOCF_2CF(CF_3)OCF_2CF_2SO_2F$ copolymer on the other side.

The unhydolyzed bifilms were irradiated with an electron beam at Irradiation Industries, Inc., Gaithersbrug, Md. The equipment used for irradiation was a 3.0 million electron voltage, 25 milliampere Dynamitron manufactured by Radiation Dynamics Inc. The irradiation dosages for the bifilms were selected from 0, 0.5 1, 2, 3, 4, 5, 6, 7, 8, and 9 megarads.

The irridated bifilms, along with the control (0 megarads), were hydrolyzed by soaking in a solution of 14% KOH/30% DMSO/56% water at 25° C. for 16 hours, then washed and dried. The bifilms were then preswelled at 2 wt % NaOH, and installed in identical laboratory cells with an effective bifilm diameter of 7.5. cm. The hydrolyzed $TFE:CF_2=CFOCF_2CF(CF_3)OCF_2CF_2COOCH_3$ copolymer layer was on the cathode side and the hydrolyzed $TFE:CF_2=CFOCF_2CF(CF_3)OCF_2CF_2SO_2F$ copolymer layer on the anode side. The cathode was mild steel, the anode was activated with a coating containing ruthenium oxide, and the bifilm was urged against the anode by the catholyte head. Purified brine was used. Electrolysis was carried out at 90° C. and 3.1 kA/m$^2$ current density to make 32, 96, 40, and 43 wt % caustic. Each cell was held at each caustic concentration for 8 days on line.

FIG. 4 displays the variation of cell voltage with radiation dosage at each caustic concentration. From the curves in FIG. 4 it is evident that in the case of irradiated unhydrolyzed bifilms the operating voltage is as much as 100 millivolts lower (depending on the radiation dosage) compared with the control bifilm.

I claim:

1. A process for modifying a fluorinated cation exchange membrane comprising irradiating said membrane, in an environment substantially free of a monomer which would graft polymerize with components of said membrane, with a non-spark-producing ionizing radiation with a dose sufficient to decrease the voltage in the use of the membrane for the electrolysis of an anolyte, in which the anolyte is either a sodium chloride or potassium chloride solution.

2. The process of claim 1 wherein electron beam irradiation is used and the anolyte is sodium chloride.

3. The process of claim 2 wherein the does if 0.5-10 megarads.

4. The process of claim 3 wherein the dose is achieved in a single exposure to the radiation.

5. A modified fluorinated cation exchange membrane made by the process of claim 1.

6. The membrane of claim 5 wherein the membrane comprises at least two layers in which at least one layer which is to be in contact with the anolyte during electrolysis has pendant sulfonyl groups.

7. The process of claim 1 wherein the membrane is irradiated in its salt form.

8. The process of claim 1 wherein the membrane is irradiated in its unhydrolyzed or partially hydrolyzed form.

* * * * *